US009743274B2

(12) United States Patent
Gunnarsson et al.

(10) Patent No.: US 9,743,274 B2
(45) Date of Patent: Aug. 22, 2017

(54) METHODS AND DEVICES FOR DEVICE TO DEVICE COMMUNICATION SOURCE ADDRESS CHANGE INDICATION

(71) Applicant: Telefonaktiebolaget L M Ericsson (publ), Stockholm (SE)

(72) Inventors: Fredrik Gunnarsson, Linköping (SE); Bengt Lindoff, Bjärred (SE); Pontus Wallentin, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 42 days.

(21) Appl. No.: 14/647,966

(22) PCT Filed: Mar. 5, 2015

(86) PCT No.: PCT/SE2015/050248
§ 371 (c)(1),
(2) Date: May 28, 2015

(87) PCT Pub. No.: WO2015/142246
PCT Pub. Date: Sep. 24, 2015

(65) Prior Publication Data
US 2016/0277922 A1 Sep. 22, 2016

Related U.S. Application Data

(60) Provisional application No. 61/968,903, filed on Mar. 21, 2014.

(51) Int. Cl.
*H04W 36/00* (2009.01)
*H04W 8/26* (2009.01)
(Continued)

(52) U.S. Cl.
CPC ......... *H04W 8/26* (2013.01); *H04W 36/0022* (2013.01); *H04W 36/24* (2013.01);
(Continued)

(58) Field of Classification Search
CPC ... H04W 80/04; H04W 88/184; H04W 8/082; H04W 8/26; H04W 12/02; H04W 12/06;
(Continued)

(56) References Cited

U.S. PATENT DOCUMENTS

2003/0007481 A1* 1/2003 Wada ............... H04L 29/12009
370/349
2009/0323632 A1 12/2009 Nix
(Continued)

FOREIGN PATENT DOCUMENTS

GB 494633 10/1938
WO 2009150233 A2 12/2009

OTHER PUBLICATIONS

International Searching Authority, Invitation to pay additional fees, communication relating to the results of the partial international search, issued in corresponding International Application No. PCT/SE2015/050248, dated Jun. 19, 2015, 5 pages.
(Continued)

*Primary Examiner* — Ronald Eisner
(74) *Attorney, Agent, or Firm* — Rothwell, Figg, Ernst & Manbeck, P.C.

(57) ABSTRACT

A method implemented in a user equipment (UE) includes obtaining an indication for changing a first source address to a second source address, where the first source address is used in a device to device communication session. The method further includes obtaining the second source address. The method further includes generating a message including the second source address. The method also includes transmitting the generated message using the first source address.

14 Claims, 18 Drawing Sheets

(51) Int. Cl.
| | |
|---|---|
| *H04W 76/04* | (2009.01) |
| *H04W 36/24* | (2009.01) |
| *H04W 56/00* | (2009.01) |
| *H04W 72/04* | (2009.01) |
| *H04W 88/06* | (2009.01) |
| *H04L 29/12* | (2006.01) |

(52) U.S. Cl.
CPC ..... *H04W 56/0015* (2013.01); *H04W 72/042* (2013.01); *H04W 76/043* (2013.01); *H04L 61/103* (2013.01); *H04L 61/2038* (2013.01); *H04L 61/6022* (2013.01); *H04W 88/06* (2013.01)

(58) Field of Classification Search
CPC . H04W 36/0011; H04W 36/02; H04W 40/02; H04W 76/022; H04W 84/12; H04W 8/12; H04W 92/045; H04W 24/00; H04W 28/06
USPC ....... 455/432.1–434, 436–444; 370/321–334
See application file for complete search history.

(56) References Cited

U.S. PATENT DOCUMENTS

2013/0322388 A1* 12/2013 Ahn ................... H04W 76/023
370/329
2013/0329613 A1* 12/2013 Conn .................. H04L 29/0653
370/310

OTHER PUBLICATIONS

Second Written Opinion issued by the International Preliminary Examining Authority in International application No. PCT/SE2015/050248 dated Feb. 10, 2016, 7 pages.
3GPP TR 36.843 V1.2.0 (Feb. 2014), 3rd Generation Partnership Project; Technical Specification Group Radio Access Network; Study on LTE Device to Device Proximity Services; Radio Aspects (Release 12), 49 pgs.
International Searching Authority, Notification of Transmittal of the International Search Report and the Written Opinion of the International Searching Authority, issued in corresponding International Application No. PCT/SE2015/050248, dated Aug. 26, 2015, 19 pages.

* cited by examiner

METHODS AND DEVICES FOR DEVICE TO DEVICE COMMUNICATION SOURCE ADDRESS CHANGE INDICATION

CROSS REFERENCE TO RELATED APPLICATION

This application is a 35 U.S.C. 371 National Phase Entry Application from PCT/SE2015/050248, filed Mar. 5, 2015, which claims the benefit of U.S. Patent Application No. 61/968,903 filed on Mar. 21, 2014, the disclosure of which are incorporated herein in their entirety by reference.

TECHNICAL FIELD

This disclosure relates generally to device to device communications, more particularly, to methods and devices for communication source address change indication.

BACKGROUND

Traditional communication in terrestrial radio networks is via links between User Equipments (UEs) and base stations. However, when two UEs are in the vicinity of each other, then direct device to device (D2D) communication may be an option. D2D communication may be dependent on synchronization information from either a base station or a different node such as a cluster head (CH) (i.e., a UE acting as a synchronization source) providing local synchronization information, or a UE enabled to relay synchronization information from a different synchronization source. The synchronization source from enhanced NodeB (eNB)/CH is used for intra-cell/cluster communication. The relayed synchronization signal is used for inter-cell/cluster communication.

In order to support at least Public Safety scenarios, the UE behavior is mapped to different coverage states. These coverage states are dependent on the UE being In network Coverage (InC) or Out of network Coverage (OoC). One state is "UL+DL-coverage" (State A). In this state, a UE is expected to be able to establish an RRC connection, if needed, and therefore, D2D transmission in this area uses granted resources.

Another state is "Edge-of-Coverage" (State B). In this state, a UE is expected to be able to at least detect broadcast system information transmitted by the eNB, and hence D2D transmission is based on broadcasted D2D resources.

Another state is "OoC with relayed control plane detected" (State C). In this state, a UE is OoC but it detects a control plane originally from an eNB and relayed by an in-coverage UE. Therefore, D2D transmission in this state uses resources that are relayed by a CP relay UE (on the PD2DSCH) and originally from an enodeB.

Another state is "OoC" (State D). In this state, a UE is OoC and unable to detect a control plane originally from an eNB and relayed by an in-coverage UE. In this case the UE uses pre-configured resources for D2D transmission.

FIG. 1 illustrates the states discussed above. UE A can use the D2D functionalities supported in coverage state A, while UE B only supports D2D functionalities according to state B. UE C only supports D2D functionalities according to state C, and UE D, in this case, is out of network coverage (state D).

Furthermore, there are different modes of D2D communications. In a first mode, mode 1, the UE receives resource allocations from the serving base station and use those for communication (state A). In a second mode, mode 2, the UE selects resources for communication from a pool of resources, which either have been sent to the UE via eNB broadcast (state B), via a control plane relaying UE (state C), or pre-configured (state D)

The D2D transmissions are supported by a synchronization signal D2DSS, and optionally a synchronization message PD2DSCH to convey synch and information to the receiver(s). Payload data is scheduled via a scheduling assignment (SA). SA and payload may contain source and/or destination addresses, or may be scrambled by a sequence associated to the source and/or destination address. FIG. 2 illustrates an example of allocation of resources.

In the 3GPP specification, the following definitions have been made on the identifiers for communication for Proximity-based Services:

ProSe UE ID: This ID is a link layer identifier assigned by the EPS that uniquely represents the UE in the context of ProSe Direct Communication. This ID is used as a source Layer-2 address in all the packets the UE sends for ProSe Direct Communication ProSe Layer-2 Group ID: This ID is a link layer identifier that identifies the group in the context of one-to-many ProSe Direct Communication. It is used as a destination Layer-2 address in all the packets the UE sends to this group.

The transmission mode, when sending data during D2D communication, may be either (i) unicast (i.e., a specific UE is the receiver), (ii) multicast (may also be denoted groupcast)(i.e., a group of UEs are receivers), or (iii) broadcast—all UEs are receivers.

For multicast transmissions, for example, in a "multicast MAC data PDU," the transmitting UE maps the ProSe identifiers to L2 addresses. For example, as illustrated in FIG. 3, the ProSe UE ID is mapped to a source L2 address carried in the MAC header, and the ProSe Layer-2 Group ID is mapped to destination layer 2 address carried in the MAC header. Also, the ProSe identifiers may also be mapped onto different addresses and mechanisms in the physical layer.

In mode 1, it is the eNB that controls the D2D communication, and therefore potentially also the L2 source address of the UE. This is similar to how L2 addresses are handled for cellular communication, where the eNB assigns the L2 identifier C-RNTI (Cell Radio Network Temporary Identifier), and the UE is configured with a new C-RNTI upon handover to a different cell.

There are several purposes of the source and destination addresses in the MAC layer. One purpose is to perform MAC filtering (i.e., to discard data PDUs already in MAC which are not intended for the receiving UE). However, another important purpose is to enable the receiving UE to identify the receiving RLC entity (i.e., to support reassembly in RLC). The combination of source and destination addresses identifies the receiving RLC entity.

The physical layer also provides potential mechanisms, which may be used as part of a D2D communication addressing scheme. An example of an implicit addressing mechanism is the physical cell identity, as defined by the PSS/SSS synchronization signal transmitted by the eNB. A UE receiving a data block using a given synchronization signal as a timing reference, should be able to distinguish this data block from another data block using a different synchronization signal as a timing reference.

As an example, a D2D Synchronization Source transmits a D2D Synchronization Signal, which in turn includes an identification mechanism (e.g., by having the UE choose one of several synchronization signal patterns). A UE that receives two data blocks, which use different D2D Synchronization Signals as timing references, should be able to distinguish the two data blocks.

Additionally, the scheduling assignment also includes an identity. This "L1 identity" is used by the receiver for physical layer filtering of the scheduling assignments. If the "L1 identity" is based on the destination address of the data, it facilitates DRX in the receiver for multicast and unicast. For broadcast, the destination address is fixed and the "L1 identity" may be based on the source address instead.

FIG. 4 illustrates a UE-UE (PC5) interface user plane protocol stack for ProSe direct communication. The ProSe application interacts with the user and also handles functions as, for example, group management. A given application is identified by a ProSe Application Id. In the IP layer, IP Multicast addressing is utilized in case of one-to-many communication.

Layer 2 (PDCP, RLC, MAC and PHY) offers a broadcast communication service ("D2D Broadcast"). The D2D data radio bearers carries user data (IP packets). The D2D signaling radio bearers carry signaling. The only signaling identified is tentatively named the "ProSe protocol" and would be used, for example, for mutual UE-UE authentication and discovery.

Furthermore, a UE within coverage also uses the UE-Network interface (LTE-Uu), which is a 3GPP protocol stack, and enhanced with the required D2D assistance support. From a protocol architecture point of view, the UE-UE and UE-Network protocol stacks are in principle independent. However, an in-coverage UE would naturally enjoy D2D network assistance over the UE-Network (LTE-Uu) protocol stack. Any network assistance information may be used to manage the UE-UE (Ud) protocol stack via the ProSe Management entity.

The D2D data radio bearer configuration is preconfigured in the UEs when they are out of coverage or in idle mode. A UE in connected mode may receive dedicated D2D data radio bearer configuration (FFS).

There are some problems with the existing solutions. A communication between two devices needs to be identified so that receiving devices can retrieve the correct data blocks. Therefore, the communication is tagged with identifiers, such as source and destination identifiers. When a user moves between the states, the UE may change its source address. For example, in mode 1, the UE may have received the source address from the eNB, and when moving into a state where mode 2 is used, the UE will generate the source address itself. Another example is that the source address is assigned by the ProSe Key Management Function as defined in 3GPP TS 33.303 V.12.2.0, and may be subject to changes. Yet another example is that the source address is self-assigned by the UE, and that the UE should be prepared to handle conflicts of source addresses using mechanisms such as self-assigning a new source address when a conflict is detected, 3GPP TS 23.303 V.12.3.0.

The receiving end will identify MAC data blocks based on the source and destination addresses, used to identify the receiving RLC entity and then RLC sequence numbers are used to reorder the data blocks, but if the source address has changed, then it will fail compiling the data blocks since it can't find the RLC entity to receive the data blocks. In particular, if a transmitted IP packet was segmented into several RLC PDUs, and the source address change happened during transmission of this segmented IP packet, the whole IP packet is lost. Therefore, protocols above the MAC layer may stall, or at least require a dedicated recovery procedure that will cause a critical interruption in the communications. TCP is especially very sensitive to lost IP packets.

SUMMARY

According to some embodiments, a method implemented in a user equipment (UE) includes obtaining an indication for changing a first source address to a second source address, where the first source address is used in a device to device communication session. The method further includes obtaining the second source address. The method further includes generating a message including the second source address. The method also includes transmitting the generated message using the first source address.

In some embodiments a method implemented in a first user equipment (UE) includes receiving a first data packet in a device to device communication session from a second UE, where the received data packet is associated with a first source address. The method further includes receiving a message including a second source address from the second UE, where the message is transmitted from the second UE using the first source address. The method further includes receiving a second data packet in the device to device communication session from the second UE, where the second data packet transmitted from the second UE using the second source address. The method also includes associating the second data packet with the first data packet.

In some embodiments, a method implemented in a first user equipment (UE) includes receiving a first data packet in a device to device communication session from a second UE, where the received data packet is associated with a first source address. The method further includes receiving a second data packet in the device to device communication session from the second UE, where the second data packet is transmitted from the second UE using the second source address. The method further includes determining that the first data packet is associated with the second data packet. The method also includes associating the second source address with the first source address.

According to some embodiments, a user equipment (UE) includes a processor and a computer readable medium coupled to the processor, said computer readable medium containing instructions executable by the processor. The UE is obtain an indication for changing a first source address to a second source address, where the first source address is used in a device to device communication session. The UE is further operative to obtain the second source address. The UE is further operative to generate a message including the second source address. The UE is further operative to transmit the generated message using the first source address.

According to some embodiments, a first user equipment (UE) includes a processor and a computer readable medium coupled to the processor, said computer readable medium containing instructions executable by the processor. The first UE is operative to receive a first data packet in a device to device communication session from a second UE, the received data packet associated with a first source address. The first UE is further operative to receive a message including a second source address from the second UE, where the message is transmitted from the second UE using the first source address. The first UE is further operative to receive a second data packet in the device to device communication session from the second UE, where the second data packet is transmitted from the second UE using the second source address. The first UE is also operative to associate the second data packet with the first data packet.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
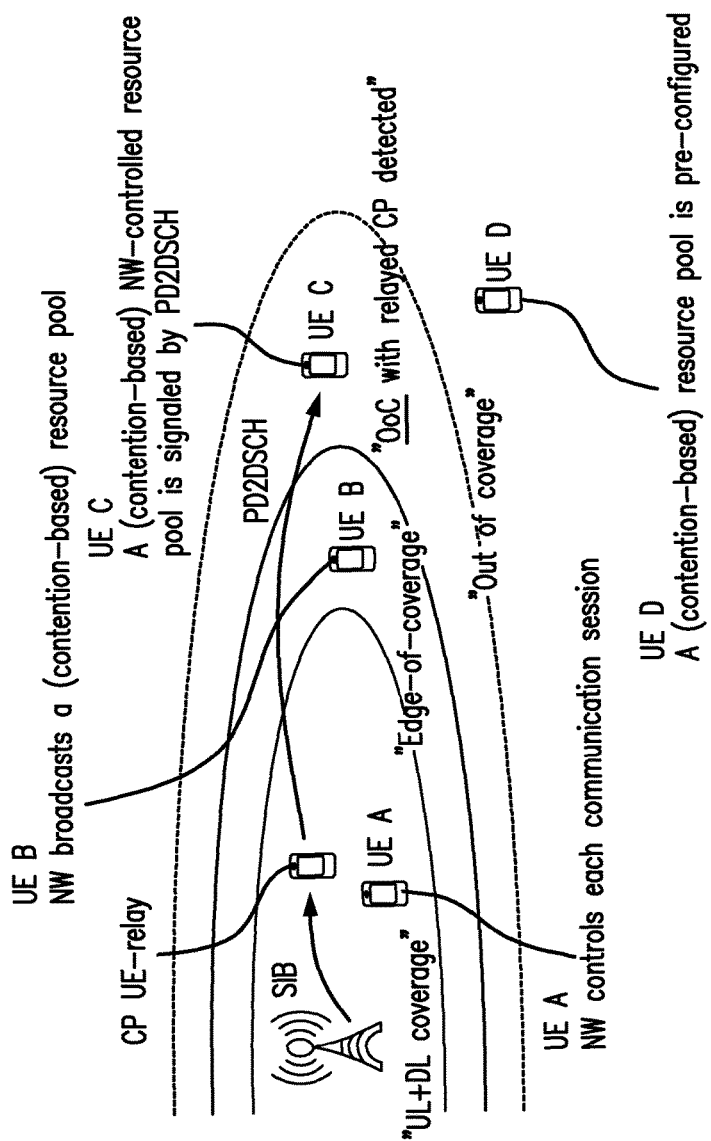
FIG. 1 is an illustration of different type of network coverages for D2D communication.
Figure 2:
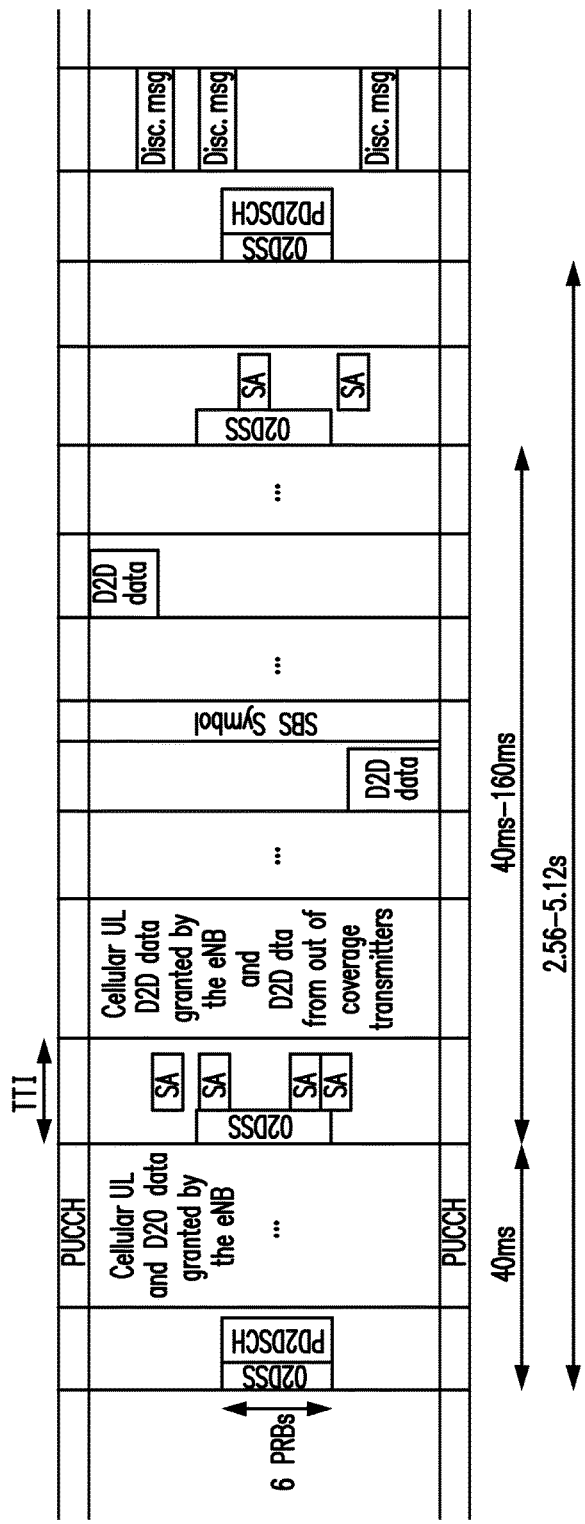
FIG. 2 is an example of allocation of resources.
Figure 3:
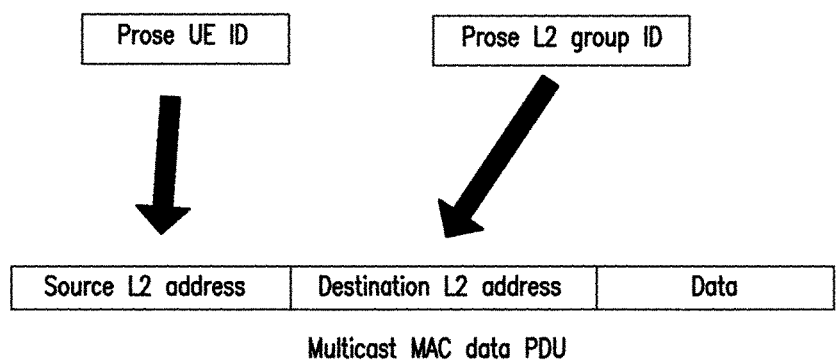
FIG. 3 is an illustration of mapping ProSe identifiers to MAC addresses.
Figure 4:
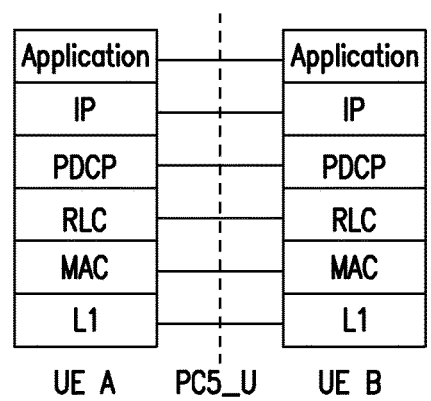
FIG. 4 illustrates an example UE-UE interface.
Figure 5:
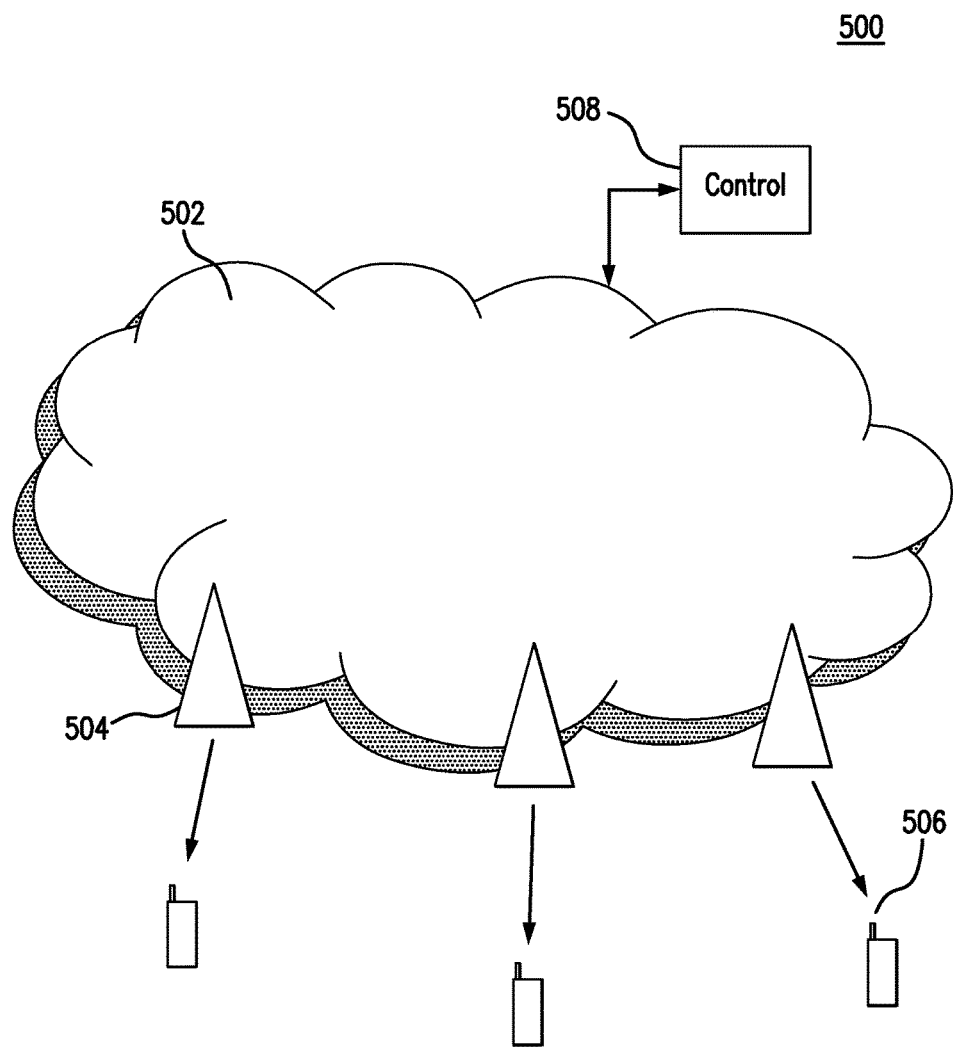
FIG. 5 is an illustration of an exemplary wireless communication system in accordance with exemplary embodiments.

Referring to FIG. 5, a wireless communication deployment 500 in accordance with exemplary embodiments includes an access node 504 serving a wireless communication device (WCD) 506. Examples of WCDs include, but are not limited to, mobile telephones, user equipments (UEs), personal digital assistants, electronic readers, portable electronic tablets, wireless sensors, machine communication devices, personal computers, and laptop computers. Furthermore, the device 506 may be a legacy UE or dynamic TDD capable UE. Access node 504 may be, for example, a base station, an eNodeB, relay node, or gateway type device, and is capable of communicating with device 506, along with any additional elements suitable to support wireless communication between wireless communication devices or between a wireless communication device and another communication device, such as landline telephone. The access node 504 may be in communication with, for instance via a network 502, one or more control nodes 508, such as a Radio Network Controller (RNC), a Mobility Management Entity (MME), a Mobile Switching Center (MSC) or Base Station Subsystem (BSS). Although node 508 is explicitly identified as a control node, each of nodes 504, 506, and 508 may be understood as a "control" node to the extent that it includes a control unit or otherwise implements control functions.

Figure 6:
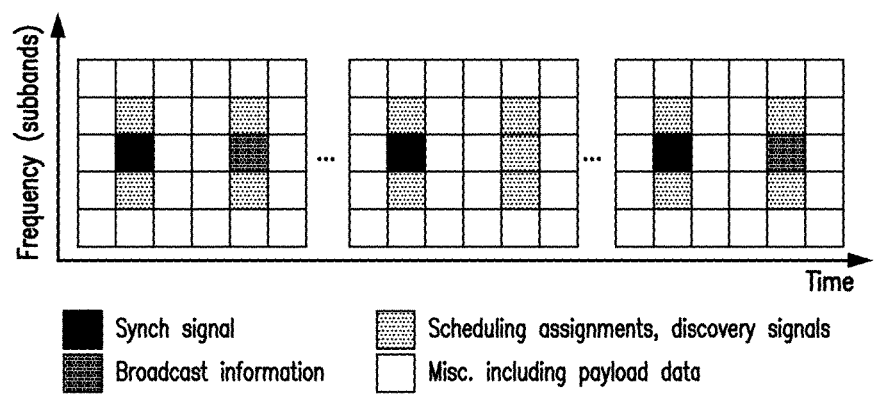
FIG. 6 is an illustration of example D2D resource components.

According to some embodiments, when a D2D UE is about to switch from a first D2D resource to a second D2D resource, the UE may also change a source address from a first source address to a second source address. When the D2D UE changes the source address, the UE compiles a message containing the second source address. The message is transmitted over the first D2D resource using the first source address for addressing. Then, the UE starts transmitting D2D data over the second resource, using the second source address for addressing. FIG. 6 illustrates an example of D2D resource components. In state A, the base station will schedule SA and data so that it is conflict-free, while in the other states the UE has to determine that the resource is free before using it.

Figure 7:
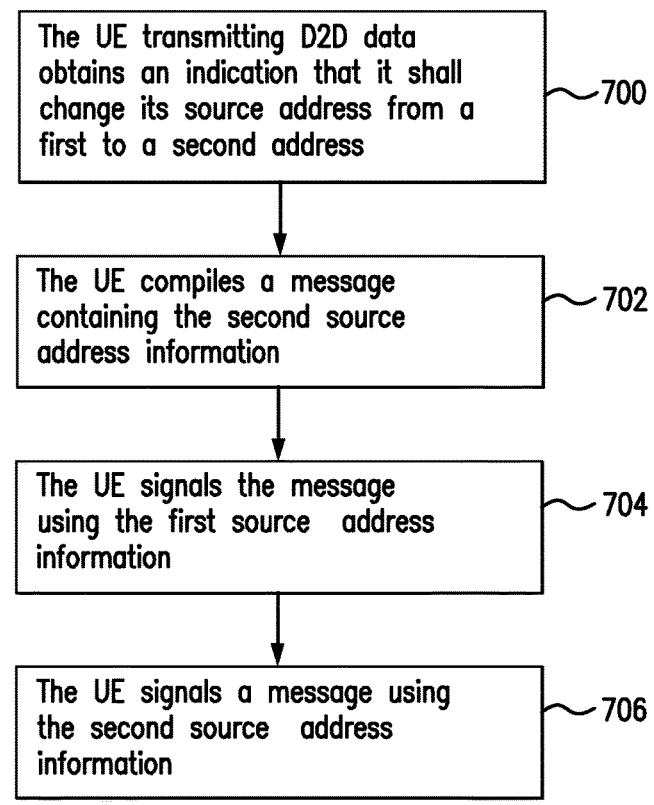
FIGS. 7-11 are illustrations of exemplary flow charts.

FIG. 7 is a flow chart illustrating an embodiment of a process performed by a UE transmitting D2D data. The process may generally start at step 700 where the UE transmitting D2D data obtains an indication that the UE shall change its source address from a first to a second address. In step 702, the UE compiles (e.g., generates) a message containing the second source address information. In step 704, the UE signals (i.e., transmits) the message using the first source address. In step 706, the UE signals a message (e.g., transmits a data packet) using the second source address information. Step 706 does not need to be performed when the UE has no data to transmit.

Figure 12:
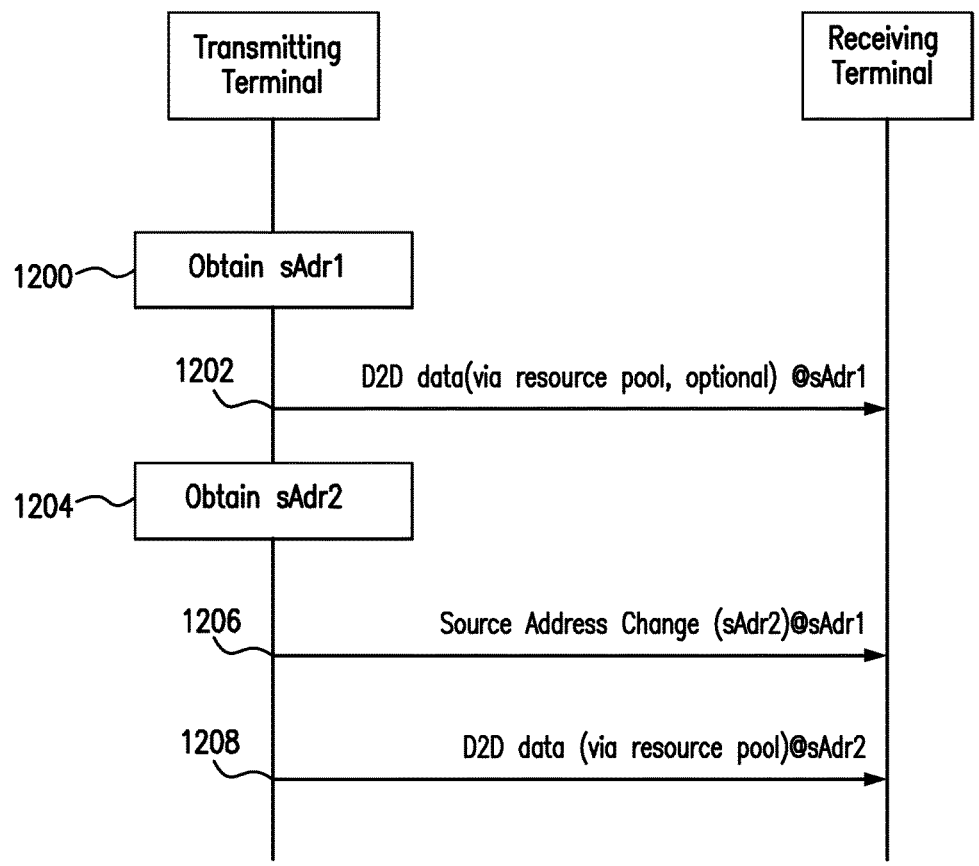
FIGS. 12-15 are illustrations of exemplary sequence diagrams.

FIG. 12 illustrates a sequence diagram corresponding to the process illustrated in FIG. 7. The UE obtains a first source address (step 1200) and transmits D2D data using the first source address (step 1202). The UE obtains a second source address (e.g., generated by the UE, retrieved from memory, or received from a network node)(step 1204). The UE transmits a message including the second source address using the first source address (step 1206). Subsequent D2D data is transmitted using the second source address (step 1208).

In some embodiments, the second source address is obtained from a base station. In some embodiments, the UE generates the second source address.

Figure 8:
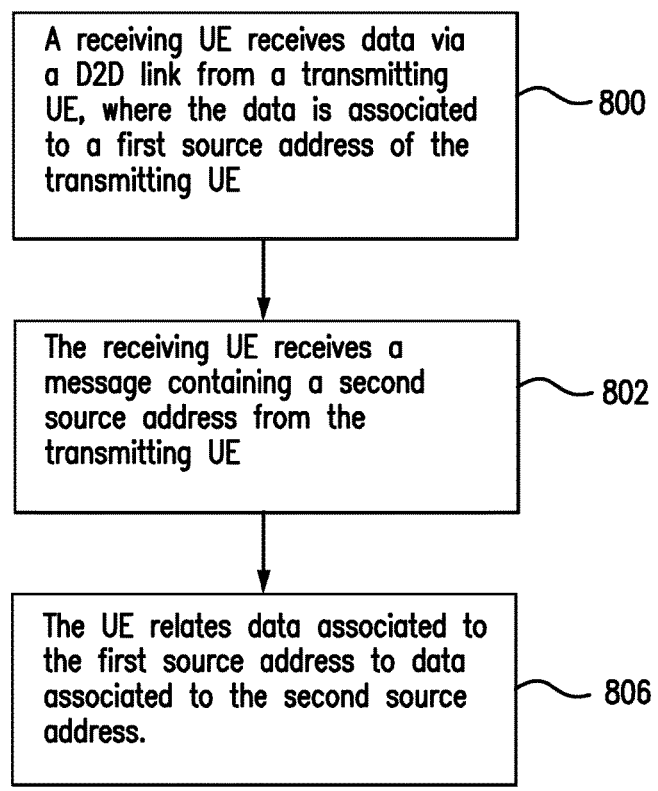

FIG. 8 illustrates an embodiment of a process performed by a UE that receives data via a D2D link (i.e., D2D communication session). The process may generally start at step 800 where a receiving UE receives data via a D2D link from a transmitting UE, where the data is associated to a first source address of the transmitting UE. In step 802, the receiving UE receives a message containing a second source address form the transmitting UE. In step 806, the UE relates data associated to the first source address to data associated to the second source address.

Additionally, the receiving UE may instead determine that a first data packet received with a first source address is associated to a second data packet received with a second source address, and thereby, the receiving UE can associate the second source address with the first source address. For example, the UE identifies an interruption in the flow of data packets associated to the first source address, and a discovery of a new flow of data packets associated to a second source address, and optionally that the first and second data flows are associated to the same destination address. In another example, the UE retrieves the first higher layer source address (typically IP address) from a first data packet associated to the first source address and the second higher layer source address from a second data packet associated to a second source address, and determining that the first and second higher layer source addresses are the same. The higher layer source address may be associated to the IP layer or the PDCP layer.

A change in source address may occur during cellular handover from a source base station to a target base station. Furthermore, cellular radio link failure or a similar trigger that makes a UE leave a D2D resource granted by the base station in favor of a D2D resource from a D2D resource pool may cause a change in the source address. Additionally, receiving a D2D grant from a base station, which causes a UE to leave a D2D resource from a resource pool in favor of the granted D2D resource may cause a change in the source address. Moreover any other reason to change source address, such as a detected conflict, triggers the transmitting UE to change the source address.

Figure 9:
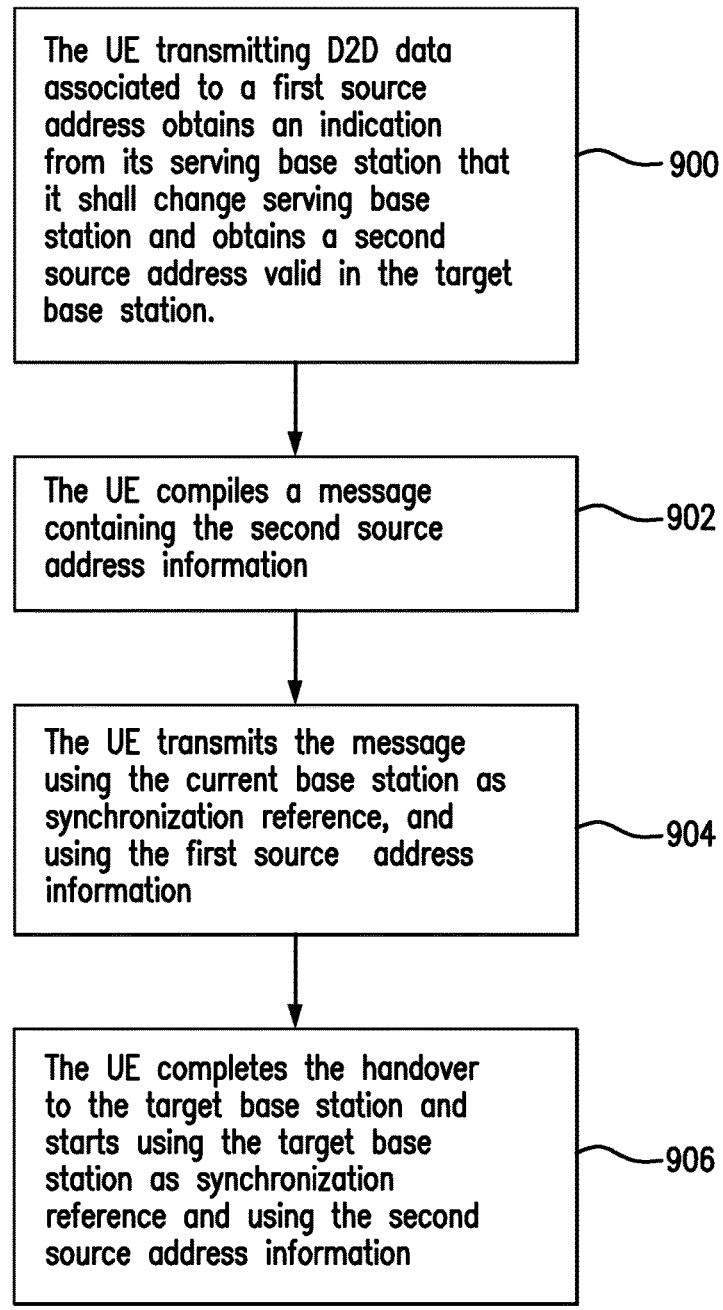

FIG. 9 illustrates an embodiment of a process for changing a source address during a cellular handover, where a UE is transmitting D2D data associated with a first source address. The first source address as well as the D2D grant may be obtained from a serving base station. The process may generally start at step 900 where the UE receives from the serving base station an indication that the UE will execute a handover to a target base station. In some embodiments, the indication comprises information about the cellular handover, which may be referred to as a handover command. Additionally, the UE receives information about its new D2D source address—the second source address.

In step 902, the UE compiles (i.e., generates) a message containing the second source address information. In step 904, The UE transmits this message, using D2D resources granted by the source base station, using the source base station as synch reference, and associating the message to the first source address. In step 906, the UE completes the cellular handover, and starts using granted D2D resources from the target base station, associating the D2D data to the second source address. The transmission of D2D data using the second source address does not need to be performed when the UE has no data to transmit.

Figure 13:
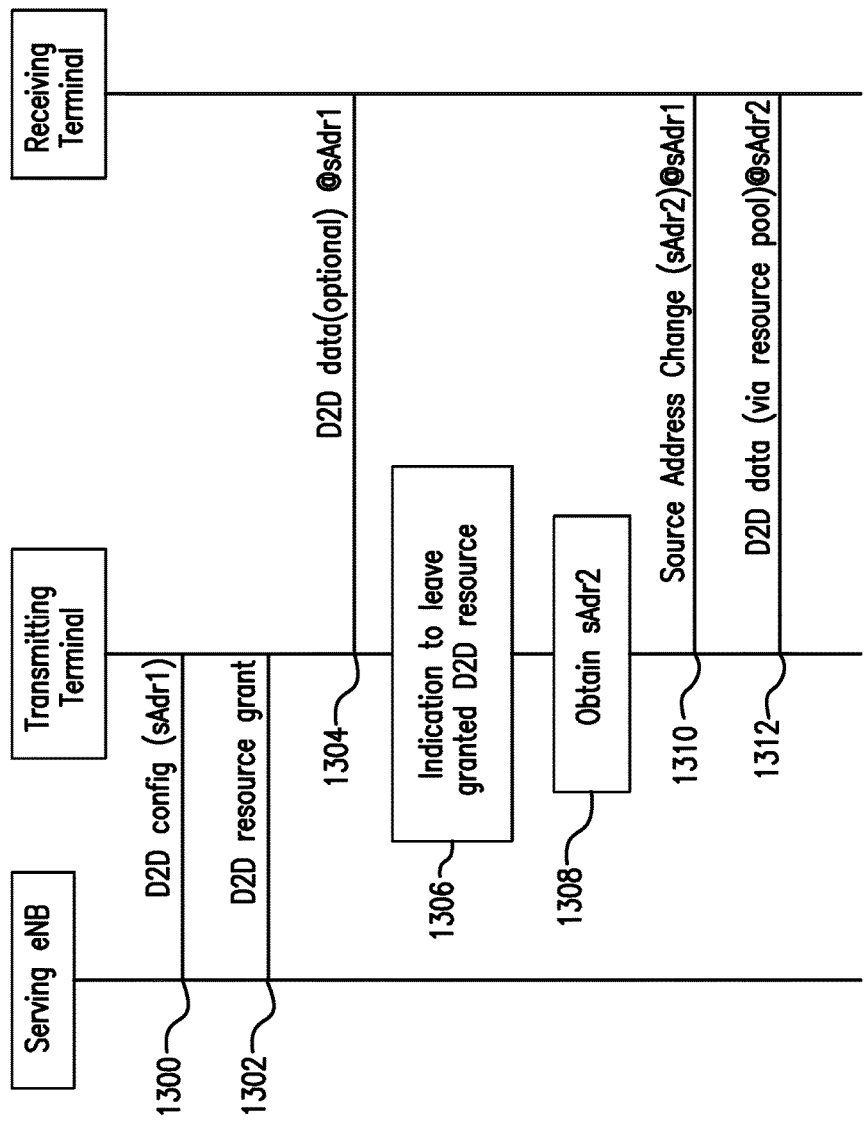

FIG. 13 illustrates a sequence diagram corresponding to the process illustrated in FIG. 9. As illustrated in FIG. 13, the UE initially is configured for D2D including assigning a first source address (step 1300) and providing a D2D grant in step 1 by the serving base station (step 1302). The UE may use such D2D grants (step 1304) for D2D transmissions. Upon handover, the target eNB compiles handover information including a second D2D source address, and sends this information to the source base station to be further transmitted to the UE (step 1306). The UE obtains the second source address (step 1308) and compiles a message containing the second source address sAdr2, and transmits the message using a D2D resource granted by the source base station and associating the message to the first source address sAdr1 (step 1310). Subsequent D2D data is sent using D2D resource granted by the target base station and associated to the second source address sAdr2 (step 1312). The source address association of messages is indicated by @sAdr1 or @sAdr2.

According to some embodiments, there can be various triggering mechanisms that cause a UE to leave granted D2D resources in favor of D2D resources from a resource pool. One example is cellular radio link failure. There are other triggers as well as discussed below with reference to the coverage states A, B, C and D, where state A is the starting state corresponding to the UE transmitting D2D data using a D2D resource granted by the serving base station. The D2D grant may be associated to a validity timer, where the grant is valid for D2D transmissions until the validity timer expires. The UE may also be entitled to use the grant as long as the UE has D2D data to transmit. Such grants may be referred to as semi-persistent. One condition for the D2D grant may specify that the UE does not transit to another state B, C or D, and if so, the D2D grant expires immediately.

In some embodiments, the UE is still entitled to use the grant to transmit a source address change if the validity timer has not expired. The transmission may occur once, or may comprise multiple transmissions. Furthermore, the UE may also include other changes such as a change of synchronization source (e.g., when transitioning to state C or D) or change of scheduling assignment and/or payload data resource pools.

One transition scenario is a transition from in-coverage granted resources (state A) to in-coverage broadcast resources (state B)(i.e., transition from state A to state B). As long as granted resources are received from the eNodeB, the UE that is RRC connected may be considered to be in coverage. In this situation, the UE may rely on standard Radio Link Monitoring to be considered to be RRC connected. RLM may be made using DL CRS and based on an estimated SIR, the SIR estimate is mapped to a hypothetical PDCCH BLER. This mapping may be a function of Antenna and system bandwidth configuration. Based on this estimated PDCCH BLER, the device determines whether it is in-sync or out-of-sync on the physical layer, which then is reported to the higher layer for further action.

If the RLM indicates that the UE is out of sync on the lower layer, a higher layer timer (T310) may be enabled, within which the UE tries to recover sync to the eNodeB. During this time, the device may use the granted D2D resources if D2D grant is still valid (e.g., D2D grant has not expired). Once, Radio Link Failure is declared, the UE stops using the granted D2D resources if the grant is still valid at time or Radio Link Failure. The UE may, on a regular basis, monitor a suitable metric based on PSS/SSS or CRS signal level or quality and a mapping function to corresponding UL coverage (i.e., using Metric III) in order to see whether the device still is in UL+DL coverage area (A), or DL, edge-of-coverage (B). UL coverage may be defined as the DL power level where an RRC connection setup may be possible with a certain reliability. In order to avoid ping pong effects, a hysteresis may be applied. For example, a first threshold for going in UL+DL coverage (B→A) may be applied (e.g., 99% connection setup reliability), and another threshold for going out of UL+DL coverage (B→A) may be applied (e.g., 90% RRC connection setup reliability).

Another transition scenario is a transition from in-coverage granted resources (state A) to out-of-coverage resources (states C and D). As an example, a UE that declares RLF has transitioned from state B to state C or D if the UE has detected a UE relaying the D2D control plane in the process when declaring RLF. As an example, in state C, UEs are unable to detect the system information broadcast from the base station, but instead are able to detect such information being relayed by a different UE which is within network coverage (in state A or B). The system information broadcast can also be referred to as control plane.

Figure 10:
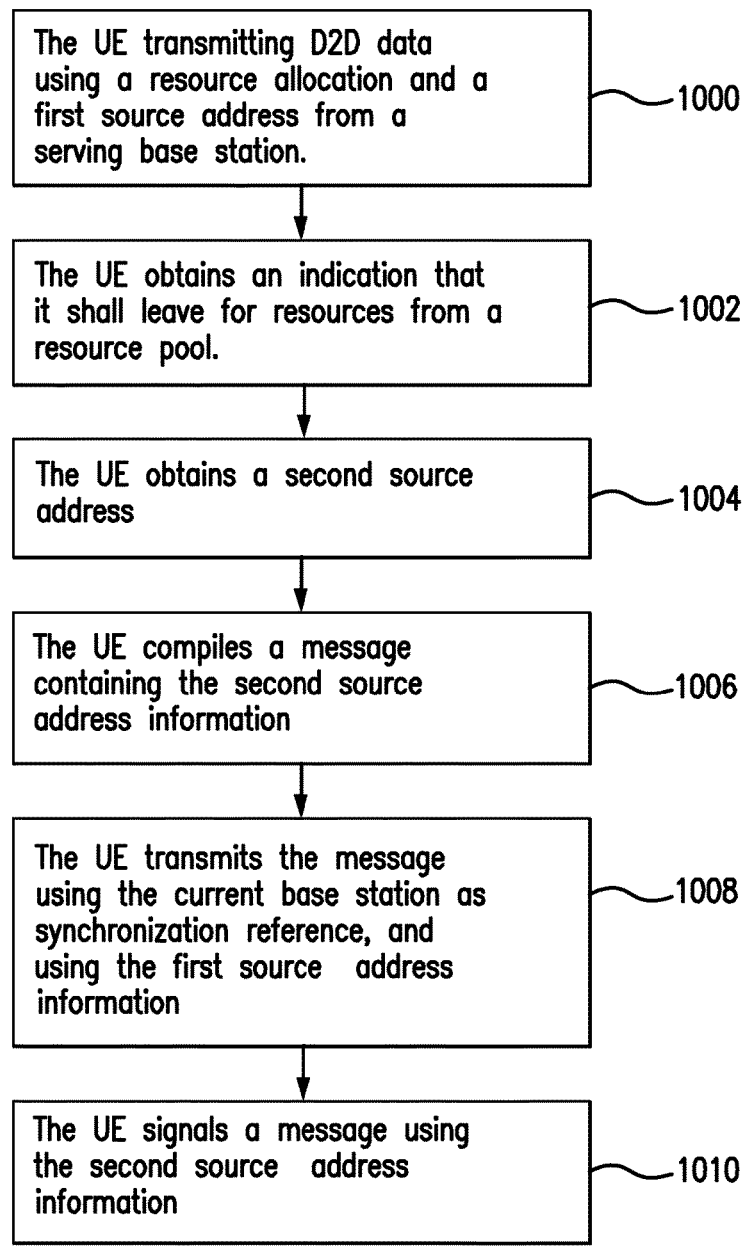

FIG. 10 illustrates an embodiment of a process performed by a UE when transitioning from an in-coverage state to an out-of-coverage state. The process may generally start at step 1000 where the UE is transmitting D2D data via a granted D2D resource by the serving base station and associating the D2D data to a first source address provided the serving base station. In step 1002, the UE obtains an indication that the UE shall leave the granted resource in favor of D2D resources from a resource pool. This indication may be provided due to a state transition as described above. When moving from state A to anyone of states B-D, in step 1004, the UE obtains a second source address. As an example, the UE generates a new source address or retrieves a previously generated source address as the second source address. In step 1006, the UE compiles a message containing the second source address information. In step 1008, the UE transmits the message using a valid D2D grant from the serving base station associating the message to the first source address. In step 1010, subsequent D2D data are transmitted using D2D resources from a resource pool while associating the D2D data to the second source address. In some embodiments, step 1010 does not need to be performed when the UE has no data to transmit.

Figure 14:
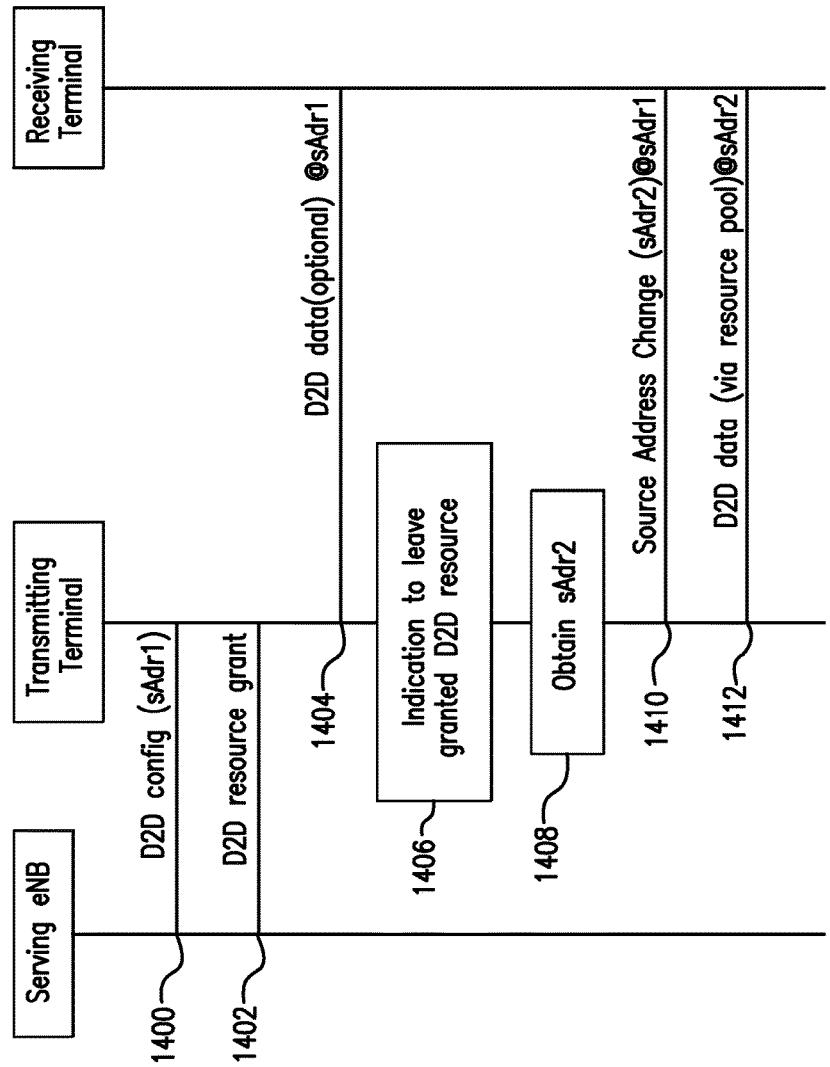

FIG. 14 illustrates a sequence diagram corresponding to the process illustrated in FIG. 10. The UE is initially configured by the serving base station including a first source address (step 1400) and a D2D grant (step 1402) for D2D data (step 1404). In step 1406, the UE receives an indication to leave the granted D2D resource as discussed above. The UE obtains (e.g., generate or retrieve from memory) a second source address (step 1408), and compiles a message containing the second source address information, and transmits the message using a valid D2D grant from the serving base station associating the message to the first source address (step 1410). Subsequent D2D data is transmitted using D2D resources from a resource pool, associating the D2D data to the second source address (step 1412).

Another transition scenario is a transition from out-of-coverage resources to in-coverage resources. In some embodiments, a UE may initially transmit D2D data using a resource from a resource pool, and receive a D2D grant from a serving base station. One example of a trigger that causes the switch from the resource pool is the reception of a valid D2D grant from the serving eNB, including a configuration of a new source address from the serving base station. This transition may be considered a transition from anyone of states B-D to state A. However, since the source address remains the same in states B, C and D, all transitions to state A may be considered to go via state B since a transition to state A typically requires the retrieval of system information which is the criterion to state B. As an example, the base station broadcasts system information about how UEs shall access the base station initially, so the UE needs to decode system information before being able to request a connection to the base station. The system information also contains information about the resource pool used in state B.

In an example for transitioning to State A, a UE has reliably detected an enodeB, and the UE has also successfully decoded broadcasted information from the enodeB. The UE may, on a regular basis, monitor a suitable metric based on a PSS/SSS or CRS signal level or quality and a mapping function corresponding to UL coverage (i.e., using Metric III) in order to see whether the device is in UL+DL coverage area (A), or DL, edge-of-coverage (B). UL coverage may be defined as the DL power level where an RRC connection setup may be possible with certain reliability. Once UL+DL coverage is determined, and D2D transmission should start, the UE establishes a RRC connection to the enodeB. If the RRC connection establishment is successful, the UE requests D2D resources from the enodeB. If D2D resources are granted, the UE uses granted resources for D2D transmissions. As an example, a grant may be valid for a certain time period. Once the grant expires, the UE may need to request new granted D2D resources from the enodeB.

Figure 11:
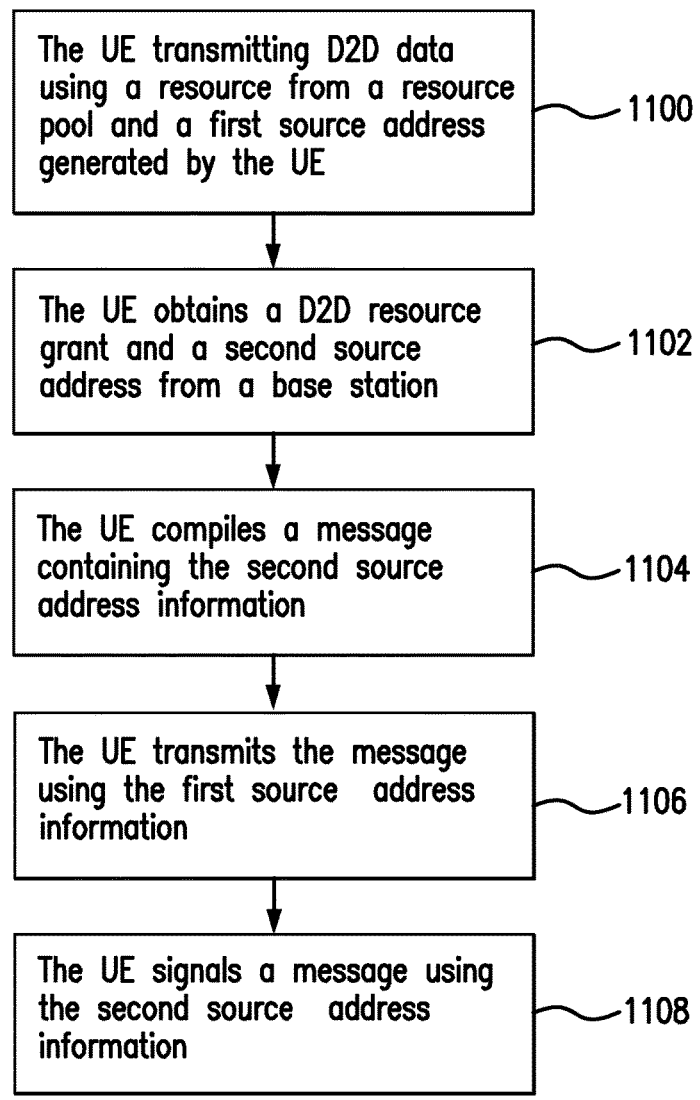

FIG. 11 illustrates an embodiment of a process from transition to out-of-coverage resources to in-network resources. The process may generally start at step 1100 where a UE initially is transmitting D2D data using a resource from a resource pool while associating the D2D data to a first source address has either been generated or retrieved from memory. In step 1102, the UE obtains a D2D configuration including a second source address and a D2D grant from the serving base station. In step 1104, the UE compiles a message containing the second source address information. In step 1106, the UE transmits the message using a D2D resource from the resource pool using the first source address. In step 1108, subsequent D2D data is transmitted using granted D2D resources while associating the D2D data to the second source address. Step 1108 does not need to be performed when the UE has no data to transmit.

Figure 15:
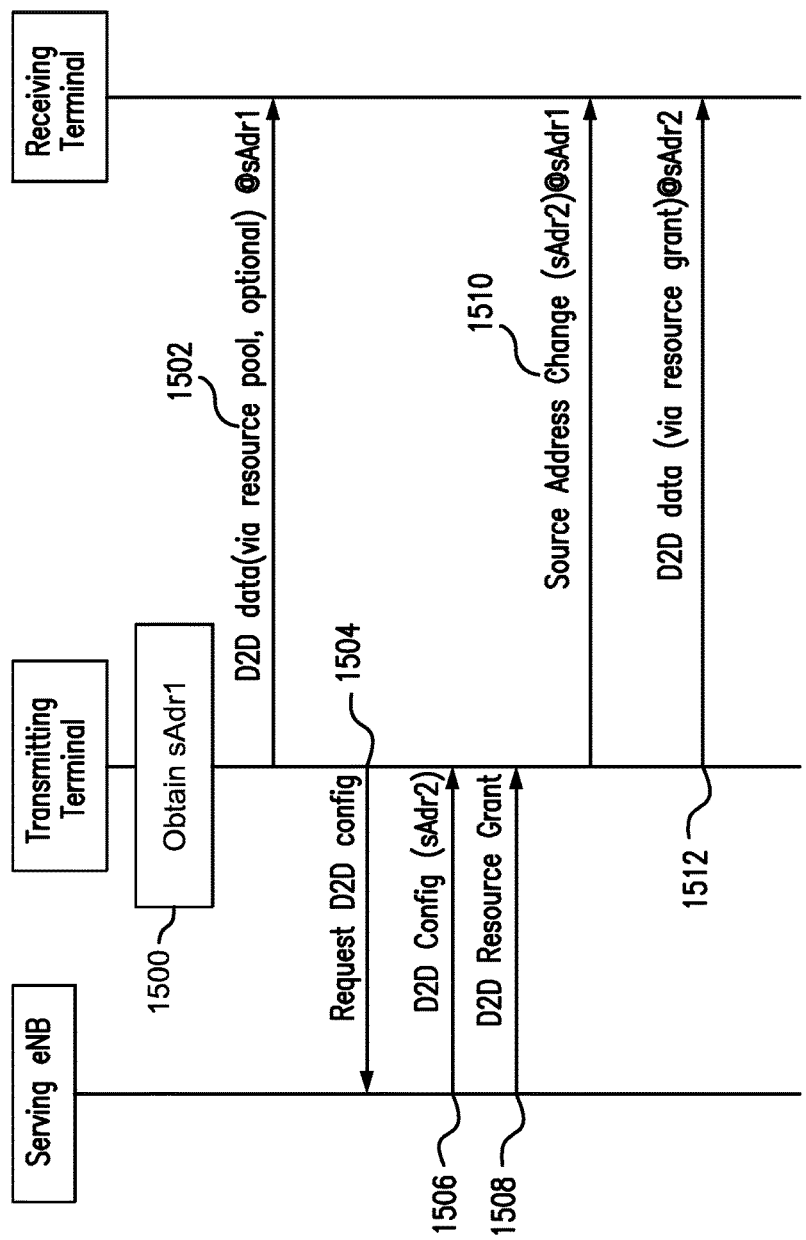

FIG. 15 illustrates a sequence diagram corresponding to the process illustrated in FIG. 11. The UE obtains (generating or retrieving from memory) a first source address sAdr1 (step 1500), and transmits D2D data using resources from a resource pool and associating the D2D data to the first source address sAdr1 (step 1502). When transitioning to state A, the UE requests D2D configuration from the serving base station (step 1504), and receives a D2D configuration including a second source address sAdr2 (step 1506) and a D2D grant (step 1508). The UE compiles a message containing the second source address information sAdr2 and transmits the message using a D2D resource from the resource pool associating the message to the first source address sAdr1 (step 1510). Subsequent D2D data is transmitted using granted D2D resources, associating the D2D data to the second source address sAdr2 (step 1512).

Figure 16:
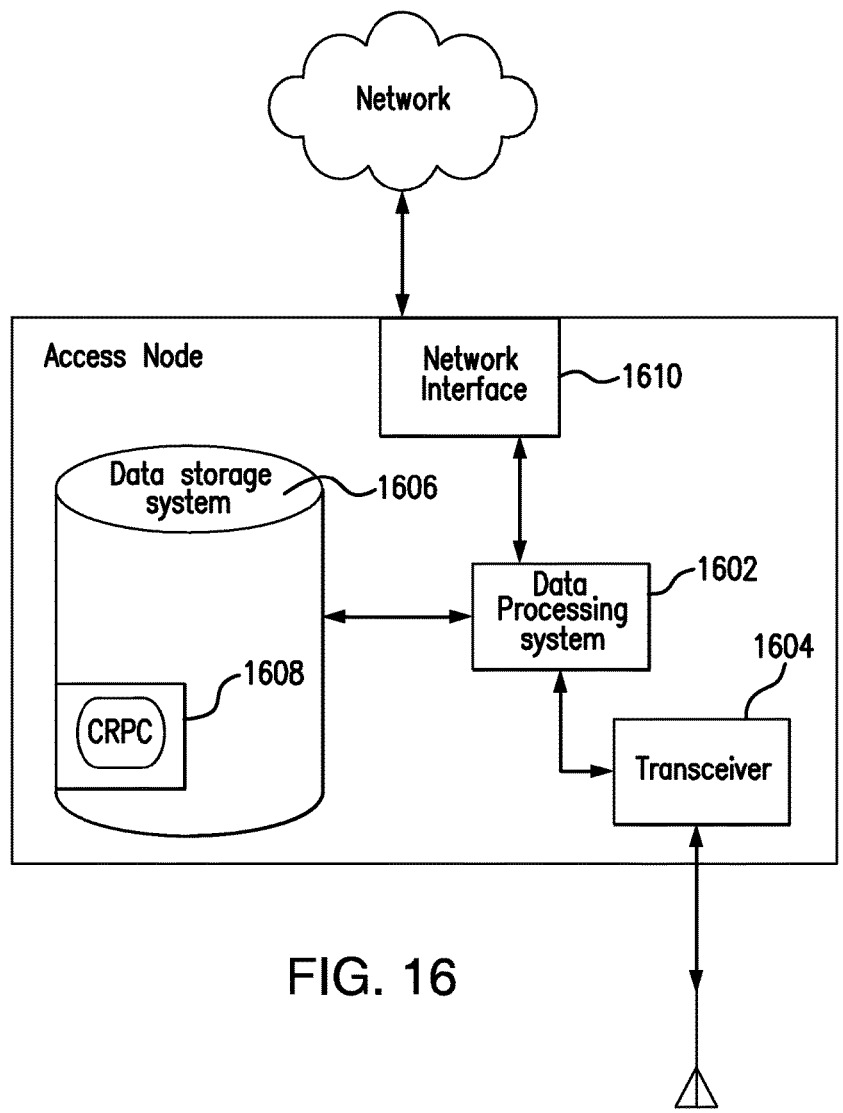
FIG. 16 illustrates an exemplary access node.

FIG. 16 illustrates a block diagram of an exemplary access node, such as node 504 shown in FIG. 5. As shown in FIG. 16, the access node 504 may include: a data processing system 1602, which may include one or more microprocessors and/or one or more circuits, such as an application specific integrated circuit (ASIC), field-programmable gate arrays (FPGAs), and the like; a network interface 1610; a transceiver 1604, and a data storage system 1606, which may include one or more non-volatile storage devices and/or one or more volatile storage devices (e.g., random access memory (RAM)). According to some embodiments, the data processing system 1602 may comprise a control unit used for selection of transmission parameters.

In embodiments where data processing system 1602 includes a microprocessor, computer readable program code (CRPC) 1608 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1602 to perform processes implemented by the access node. In other embodiments, the access node 504 is configured to perform steps described herein without the need for code. That is, for example, data processing system 1602 may consist merely of one or more ASICs. Hence, the features of the embodiments described herein may be implemented in hardware and/or software. For example, in particular embodiments, the functional components of the base station described above may be implemented by data processing system 1602 executing computer instructions, by data processing system 1602 operating independent of any computer instructions, or by any suitable combination of hardware and/or software.

Figure 17:
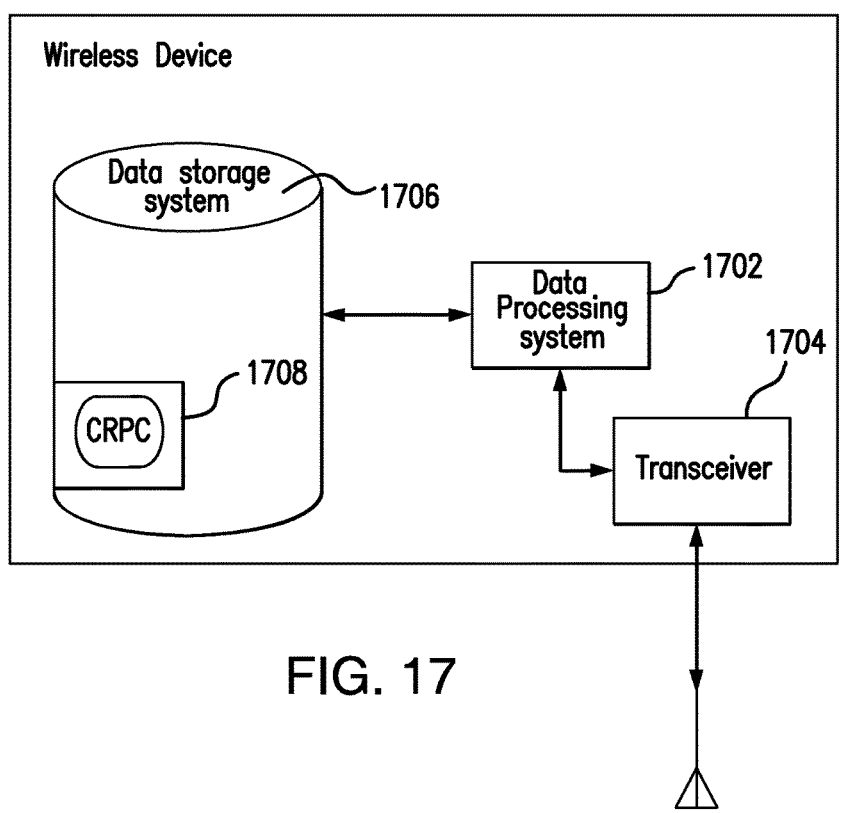
FIG. 17 illustrates an exemplary wireless device.

FIG. 17 illustrates a block diagram of an exemplary wireless device, such as device 506 shown in FIG. 5. As shown in FIG. 17, the device 506 may include: a data processing system 1702, which may include one or more microprocessors and/or one or more circuits, such as an application specific integrated circuit (ASIC), field-programmable gate arrays (FPGAs), and the like; a transceiver 1704, and a data storage system 1706, which may include one or more non-volatile storage devices and/or one or more volatile storage devices (e.g., random access memory (RAM)). According to some embodiments, the data processing system 1702 may comprise a control unit used for selection of transmission parameters.

In embodiments, where data processing system 1702 includes a microprocessor, computer readable program code (CRPC) 1708 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1702 to perform steps described above (e.g., steps described above with reference to the flow charts shown in FIGS. 7-11). In other embodiments, the device 506 is configured to perform steps described herein without the need for code. That is, for example, data processing system 1702 may consist merely of one or more ASICs. Hence, the features of the embodiments described herein may be implemented in hardware and/or software. For example, in particular embodiments, the functional components of the base station described above may be implemented by data processing system 1702 executing computer instructions, by data processing system 1702 operating independent of any computer instructions, or by any suitable combination of hardware and/or software.

Figure 18:
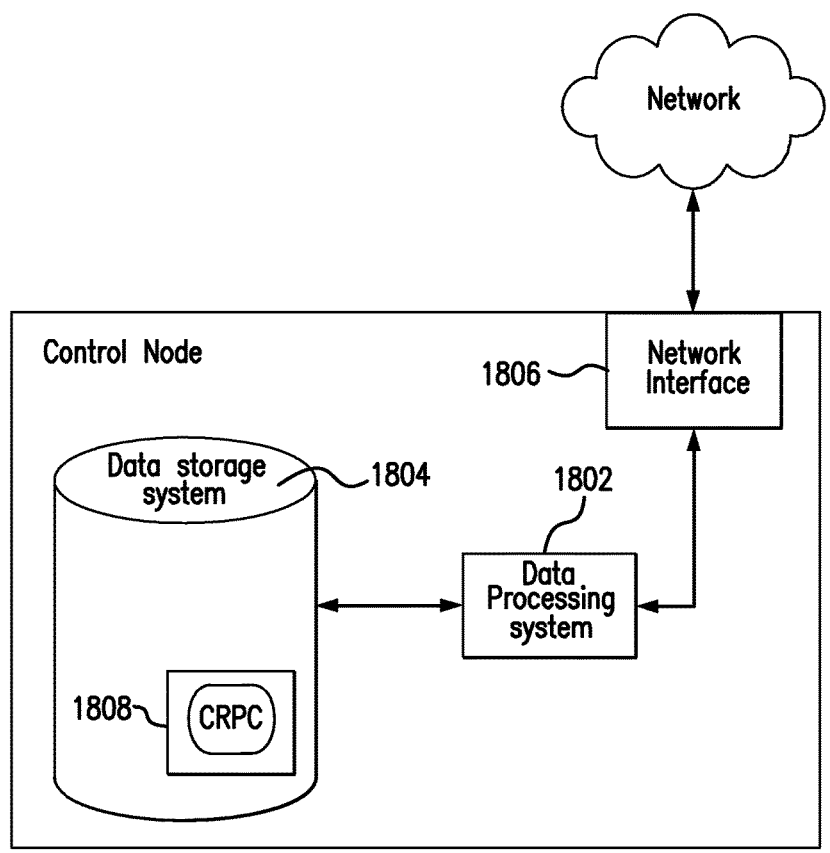
FIG. 18 illustrates and exemplary control node.

FIG. 18 illustrates a block diagram of an exemplary control node, such as node 508 shown in FIG. 5. As shown in FIG. 18, the control node 508 may include: a data processing system 1802, which may include one or more microprocessors and/or one or more circuits, such as an application specific integrated circuit (ASIC), field-programmable gate arrays (FPGAs), and the like; a network interface 1806, and a data storage system 1804, which may include one or more non-volatile storage devices and/or one or more volatile storage devices (e.g., random access memory (RAM)). According to some embodiments, the data processing system 1802 may comprise a control unit used for selection of transmission parameters.

In embodiments where data processing system 1802 includes a microprocessor, computer readable program code (CRPC) 1808 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1802 to perform processes implemented by the control node. In other embodiments, the control node 508 is configured to perform steps described herein without the need for code. That is, for example, data processing system 1802 may consist merely of one or more ASICs. Hence, the features of the embodiments described herein may be implemented in hardware and/or software. For example, in particular embodiments, the functional components of the base station described above may be implemented by data processing system 1802 executing computer instructions, by data processing system 1802 operating independent of any computer instructions, or by any suitable combination of hardware and/or software.

Advantages of the embodiments described herein include enabling data protocols to recover from a change of source address from a first source address to a second source address. The recovery allows previously received D2D data associated to a first source address to be related to subsequently received D2D data associated to a second source address. Furthermore, the recovery enables the receiving UE to associate D2D data to the correct RLC entity, which is determined based on source and destination addresses, even when the source address has changed. Support for the source address change means that RLC reordering will work despite the address change, which in turn enables reassembling of packets to higher protocol layers, and further a seamless delivery of packets in higher layers such as PDCP.

Although terminology from 3GPP HSPA has been used in this disclosure to exemplify the exemplary embodiments, one of ordinary skill in the art would understand this as not limiting the scope of the present embodiments to only the aforementioned system. Other wireless systems, including LTE, LTE-A, WiMax, UMB and GSM, may also benefit from exploiting the ideas covered within this disclosure.

Furthermore, the terminology such as NodeB and UE are non-limiting and does in particular do not imply a certain hierarchical relation between the two; in general "NodeB" could be considered as device 1 and "UE" device 2, and these two devices communicate with each other over some radio channel.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

Abbreviations

3GPP 3rd Generation Partnership Project
BSS Base Station Subsystem
CH Cluster Head
C-RNTI Cell Radio Network Temporary Identifier
D2D Device to Device Communication
DRX Discontinuous Reception
eNB Evolved Node B
EPS Evolved Packet System
GUTI Globally Unique Temporary Identity
IMSI International Mobile Subscriber Identity
InC In network Coverage
MAC Medium Access Control
MME Mobility Management Entity
MSC Mobile Switching Center
OoC Out of network Coverage
PBCH Physical Broadcast Channel
PDCP Packet Data convergence Protocol
PD2DSCH Physical D2D Shared Channel
PDU Packet Data Unit
PHY Physical Layer
PLMN Public Land Mobile Network
ProSe Proximity-based Services
PSS Primary Synchronization Sequence
RLC Radio Link Control
RNC Radio Network Controller
RRC Radio Resource Control
SA Scheduling Assignment
SSS Secondary Synchronization Sequence
UE User Equipment
UICC Universal Integrated Circuit Card
USIM Universal Subscriber Identity Module
UMTS Universal Mobile Telecommunications System
TCP Transmission Control Protocol
TDD Time Division Duplex

The invention claimed is:

1. A method implemented in a user equipment (UE) for a device to device communication, the method comprising:
obtaining, by the UE, an indication for changing a first source address to a second source address, the first source address used in a device to device communication session between the UE and a receiving UE;
generating, by the UE, the second source address to be used in the device to device communication session;
generating, by the UE, a message including the second source address; and
transmitting, by the UE and using the first source address, the generated message to the receiving UE.

2. The method according to claim 1, further comprising:
transmitting a data packet using the second source address in the device to device communication session.

3. The method according to claim 1, wherein the second source address is obtained from a base station.

4. The method according to claim 1, wherein
the obtained indication is a signal transmitted from a serving base station, the signal further providing indication of a handover, wherein the handover is to a target base station,
the second source address is associated with the target base station, and the UE transmits the generated message using the serving base station as a synchronization reference.

5. The method according to claim 4, wherein after completion of the handover to the target base station, a data packet is transmitted using the target base station as a synchronization reference.

6. The method according to claim 1, further comprising:
receiving a resource grant from a serving base station; and
transmitting, using a resource allocated by the resource grant, a data packet in the device to device communication session, wherein
the obtained indication is a signal transmitted from the serving base station, the signal further providing an indication for using a resource from a resource pool, and
the UE transmits the generated message using the serving base station as a synchronization reference.

7. The method according to claim 1, further comprising:
transmitting, using a resource from a resource pool and the first source address, a data packet in the device to device communication session, wherein
the obtained indication is a signal transmitted from a base station, the signal including a resource grant and the second source address.

8. A user equipment (UE), comprising:
a processor; and
a non-transitory computer readable medium coupled to the processor, said non-transitory computer readable medium containing instructions that, when executed by the processor, cause the UE to:
obtain an indication for changing a first source address to a second source address, the first source address used in a device to device communication session between the UE and a receiving UE,
generate the second source address to be used in the device to device communication session,
generate a message including the second source address, and
transmit the generated message to the receiving UE using the first source address.

9. The UE according to claim 8, wherein the UE is further operative to:
transmit a data packet using the second source address in the device to device communication session.

10. The UE according to claim 8, wherein the second source address is obtained from a base station.

11. The UE according to claim 8, wherein
the obtained indication is a signal transmitted from a serving base station, the signal further providing indication of a handover, wherein the handover is to a target base station,
the second source address is associated with the target base station, and
the UE transmits the generated message using the serving base station as a synchronization reference.

12. The UE according to claim 11, wherein after completion of the handover to the target base station, a data packet is transmitted using the target base station as a synchronization reference.

13. The UE according to claim 8, wherein the UE is further operative to:
receive a resource grant from a serving base station, and
transmit, using a resource allocated by the resource grant, a data packet in the device to device communication session, wherein
the obtained indication is a signal transmitted from the serving base station, the signal further providing an indication for using a resource from a resource pool, and
the UE transmits the generated message using the serving base station as a synchronization reference.

14. The UE according to claim 8, wherein the UE is further operative to:
transmit, using a resource from a resource pool and the first source address, a data packet in the device to device communication session, wherein
the obtained indication is a signal transmitted from a base station, the signal including a resource grant and the second source address.

* * * * *